(12) United States Patent
Shiotsu et al.

(10) Patent No.: US 8,035,488 B2
(45) Date of Patent: Oct. 11, 2011

(54) INFORMATION ACCESS SYSTEM AND ACTIVE-TYPE CONTACTLESS INFORMATION STORAGE DEVICE

(75) Inventors: Shinichi Shiotsu, Kawasaki (JP); Isamu Yamada, Kawasaki (JP); Satoshi Inano, Kawasaki (JP); Kouichi Yasaki, Kawasaki (JP); Akira Itasaki, Kawasaki (JP); Atsushi Sakai, Kawasaki (JP); Masahiko Takenaka, Kawasaki (JP); Takanao Ochiai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1056 days.

(21) Appl. No.: 11/247,333

(22) Filed: Oct. 12, 2005

(65) Prior Publication Data
US 2006/0276206 A1 Dec. 7, 2006

(30) Foreign Application Priority Data
Jun. 3, 2005 (JP) .................................. 2005-164066

(51) Int. Cl.
*H04Q 5/22* (2006.01)
(52) U.S. Cl. ............... 340/10.33; 340/10.51; 340/10.34; 370/311; 455/41.2
(58) Field of Classification Search ............... 340/10.33; 370/311; 455/41.2
See application file for complete search history.

(56) References Cited

U.S. PATENT DOCUMENTS

| | | | | |
|---|---|---|---|---|
| 5,539,394 A | * | 7/1996 | Cato et al. | 340/10.32 |
| 6,657,549 B1 | * | 12/2003 | Avery | 340/825.49 |
| 7,009,518 B2 | * | 3/2006 | Liao et al. | 340/572.1 |
| 7,193,504 B2 | * | 3/2007 | Carrender et al. | 340/10.4 |
| 7,360,689 B2 | * | 4/2008 | Beenau et al. | 235/380 |

(Continued)

FOREIGN PATENT DOCUMENTS
JP 62-225033 3/1987
(Continued)

OTHER PUBLICATIONS
Office Action dated Jan. 25, 2011 in a counterpart Japanese Patent Application No. 2005-164066.
(Continued)

*Primary Examiner* — Brian Zimmerman
*Assistant Examiner* — Omer S Khan
(74) *Attorney, Agent, or Firm* — Kratz, Quintos & Hanson, LLP

(57) ABSTRACT

An information access system comprises a reader/writer for continually transmitting an ID request signal at a first frequency and being continuously ready to receive an RF signal at a second frequency, and an active contactless information storage device having a receiver for sensing a carrier of an RF signal at the first frequency, and a transmitter for transmitting a response signal at the second frequency when the ID request signal is received. When the receiver senses a carrier of an RF signal at the first frequency in a particular predetermined period, the receiver receives further the ID request signal, and, in response to the ID request signal, the transmitter transmits a response signal at the second frequency carrying an ID of the storage device stored. In the carrier sensing, the controller causes the receiver to be in an active state and the transmitter to be in an inactive state in the predetermined periods. When the receiver attempts to sense a carrier of the RF signal at the first frequency in a particular predetermined period but detects no carrier, the controller controls the receiver and the transmitter to maintain the inactive state during a sleep period between the particular predetermined period and the subsequent predetermined period.

15 Claims, 12 Drawing Sheets

U.S. PATENT DOCUMENTS

| | | |
|---|---|---|
| 2002/0036569 A1* | 3/2002 | Martin .................. 340/573.1 |
| 2004/0038645 A1* | 2/2004 | Rcunamaki et al. ......... 455/41.2 |
| 2005/0237161 A1* | 10/2005 | Lee et al. .................. 340/10.33 |
| 2008/0205317 A1* | 8/2008 | Piipponen et al. ............ 370/311 |

FOREIGN PATENT DOCUMENTS

| | | |
|---|---|---|
| JP | 02-165733 | 6/1990 |
| JP | 08-116302 | 5/1996 |
| JP | 09-027782 | 1/1997 |
| JP | 2000-113130 | 4/2000 |
| JP | 2001-251210 | 9/2001 |
| JP | 2002-140298 | 5/2002 |
| WO | WO 97/43740 A1 | 11/1997 |

OTHER PUBLICATIONS

Office Action dated May 17, 2011 issued in counterpart Japanese patent application No. 2005-164066.

* cited by examiner

INFORMATION ACCESS SYSTEM AND ACTIVE-TYPE CONTACTLESS INFORMATION STORAGE DEVICE

FIELD OF THE INVENTION

The present invention relates generally to an active-type contactless information storage device which a reader/writer device can read and write information from and into in a contactless manner, and in particular to a system for reading an active-type RF ID tag or a contactless IC card with low power consumption.

BACKGROUND OF THE INVENTION

An RF ID tag with a battery power supply or of an active type, which is attached to a merchandise article or the like, or carried by a person, transmits an RF signal at a predetermined frequency that carries an ID and other information related to the article or the person, so that the RF signal is received and the information is read out by a reader device. The read-out information is further processed by a computer or the like, so that the distribution of the article or the action of the person is monitored and managed. The active-type RF ID tag with battery power supply has a larger communication range than a passive-type RF ID tag that receives power from a reader/writer device in a contactless manner, and hence is practical in use. However, the active-type RF ID tag transmits an RF signal in a fixed cycle, has a risk of being tracked by a third party, and hence has a problem in the security. To address this security problem, there has been developed an improved active-type RF ID tag that responds only to a tag ID request transmitted by the reader/writer device.

PCT International Publication WO 97-43740 describes a radio frequency identification device which includes an integrated circuit including a receiver, a transmitter, and a microprocessor. The receiver and transmitter together form an active transponder. The integrated circuit is preferably a monolithic single die integrated circuit including the receiver, the transmitter and the microprocessor. Because the device includes an active transponder, instead of a transponder which relies on magnetic coupling for power, the device has a much greater range.

Japanese Patent Application Publication JP 2000-113130-A published on Apr. 21, 2000 describes an IC tag detection system with low power consumption. This system includes a plurality of IC tags provided with different set times of day. Each IC tag includes a communication circuit, a control unit, a power source unit for supplying power from a battery to them, and time measuring means. Each IC tag performs transmission at each prescribed set time of day. This system also includes a detector for detecting the presence or absence of the IC tags based on the communication with them. The detector has a communication circuit, and determines the presence or absence of reception from them successively at the respective set times of day of the respective IC tags. Since the IC tag receives no inquiry from the detector, the IC tag can avoid useless reaction and battery consumption.

Japanese Patent Application Publication JP 2001-251210-A published on Sep. 14, 2001 describes a method of locking a frequency in transmitters at two nodes in a full duplex link, without using a separate reference oscillator in each node. The method provides locking of transmission frequencies of both nodes in a full duplex link at the same time by utilizing information of a received frequency to tune carrier frequencies of the transmitters. The offset of the carrier frequency of the fist transmitter is detected as the offset of a second corresponding receiver. The second receiver shifts the carrier frequency of the transmitter, in response to the detected offset, to inform the first transmitter about the detected offset. The first receiver uses the detected offset to correct the carrier frequency of the first transmitter.

SUMMARY OF THE INVENTION

In accordance with an aspect of the present invention, an information access system for accessing information stored in a contactless information storage device, comprises: a reader/writer device connected to an information processing apparatus, and being adapted to continually transmit an ID request signal at a first frequency and to be continuously ready to receive an RF signal at a second frequency which is different from the first frequency; and an active contactless information storage device having a memory, a control unit, a battery, a timer for measuring time, a receiver unit for sensing a carrier of an RF signal at the first frequency for detection, and a transmitter unit for transmitting a response signal at the second frequency when the ID request signal is received. The control unit controls the receiver unit to sense a carrier of an RF signal at the first frequency in predetermined periods occurring in a predetermined cycle. When the receiver unit senses and detects a carrier of an RF signal at the first frequency in a particular predetermined period, the control unit causes the receiver unit to receive further the ID request signal, and, in response to the ID request signal, causes the transmitter unit to transmit a response signal at the second frequency carrying an ID of the active contactless information storage device stored in the memory. In the carrier sensing, the control unit causes the receiver unit to be in an active state and the transmitter unit to be in an inactive state in the particular predetermined period and a subsequent predetermined period. When the receiver unit attempts to sense a carrier of an RF signal at the first frequency in the particular predetermined period but detects no carrier, the control unit controls the receiver unit and the transmitter unit to maintain the inactive state during a non-carrier sensing period between the particular predetermined period for carrier sensing and the subsequent predetermined period for subsequent carrier sensing.

In accordance with another aspect of the invention, an active contactless information storage device comprises: a memory; a battery; a timer for measuring time; a receiver unit being adapted to sense a carrier of an ID request signal at a first frequency from a reader/writer device for detection, when the active contactless information storage device approaches the reader/writer device; a transmitter unit for modulating a carrier with data and then transmitting a response signal at a second frequency to the reader/writer device; and a control unit for controlling the receiver unit and the transmitter unit. The control unit controls the receiver unit to sense a carrier of an RF signal at the first frequency for detection, in predetermined periods occurring in a predetermined cycle. When the receiver unit senses and detects a carrier of an RF signal at the first frequency in a particular predetermined period, the control unit causes the receiver unit to receive further the ID request signal, and, in response to the ID request signal, causes the transmitter unit to transmit a response signal at the second frequency carrying an ID of the active contactless information storage device stored in the memory. In the carrier sensing, the control unit causes the receiver unit to be in an active state and the transmitter unit to be in an inactive state in the particular predetermined period and a subsequent predetermined period. When the receiver unit attempts to sense a carrier of an RF signal at the first frequency in the particular predetermined period but detects no carrier, the control unit controls the receiver unit and the transmitter unit to maintain the inactive state during a non-carrier sensing period between the particular predetermined period for carrier sensing and the subsequent predetermined period for subsequent carrier sensing.

DESCRIPTION OF THE PREFERRED EMBODIMENTS

The known improved active-type RF ID tag that responds only to a tag ID request transmitted by a reader/writer device requires a receiving circuit, and hence has a larger circuit size and a significantly higher power consumption than the active-type RF ID tag capable solely of transmission.

The inventors have recognized that a reader/writer device, which is adapted to continually transmit a signal to an RF ID tag at a particular frequency and be continuously ready to receive a signal from the RF ID tag at a different frequency, will significantly reduce the power consumption of the RF ID tag, so that the battery run time can be extended.

An object of the present invention is to reduce the power consumption of an active contactless information storage device.

Another object of the invention is to provide a secure reader/writer device and a secure active contactless information storage device.

According to the invention, the power consumption of the active-type RF ID tag is reduced so that the battery run time can be extended. Further, a secure reader/writer device and a secure active-type RF ID tag can be provided.

Figure 1:
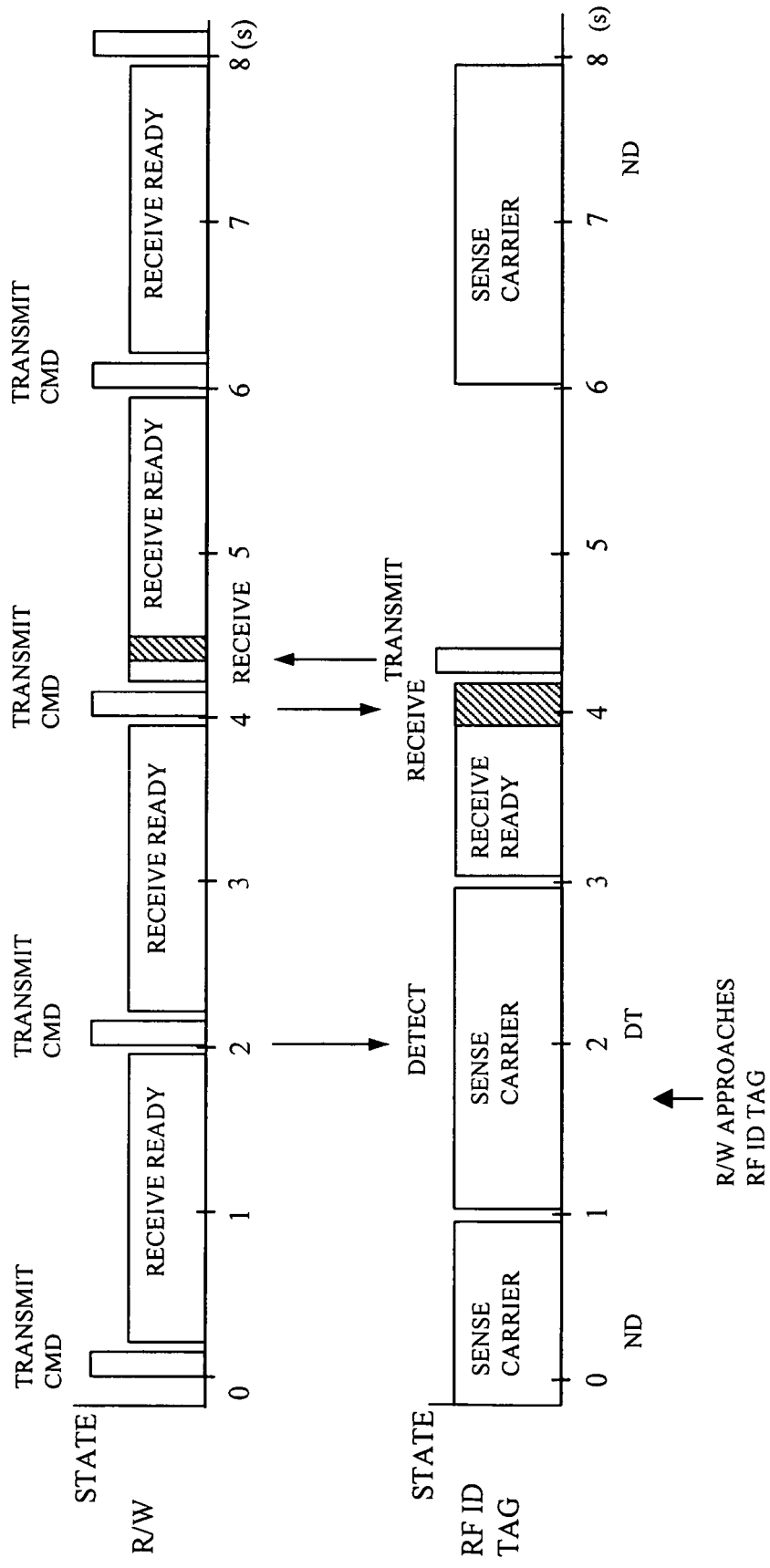
FIG. 1 is a time chart of a conventional improved active-type RF ID tag and of a reader/writer device (R/W) for reading the RF ID tag.

FIG. 1 is a time chart of a conventional improved active-type RF ID tag and of a reader/writer device (R/W) for reading the RF ID tag. The reader/writer device transmits a command (CMD) and receives a response from the RF ID on the same frequency channel in a time division manner. The reader/writer device transmits a command of requesting an ID in a fixed cycle for example, of 2 seconds and in the duration, for example, of 100 ms. In the remaining time, the reader/writer device is in a state of receive ready.

In order for such a single reader/writer device to accommodate a plurality of RF ID tags, each RF ID tag is typically adapted to transmit a response signal to the reader/writer device at a random timing in response to the receipt of a single ID request transmitted by the reader/writer device, so as to avoid possible collision with another response signal. Each RF ID tag transmits a response signal to the reader/writer device in a time slot selected at random within a predetermined period of time subsequent to the receipt of the command, so that the probability of collision between the response signals is reduced. However, the reader/writer device is required to extend the duration of the state of receive ready. For example, if the duration for response transmission at a random timing from the RF ID tag is between zero (0) and 1.5 seconds or the like, the reader/writer device requires a duration of the receive ready state for 1.5 seconds or longer. This increases the cycle length of command transmission in the reader/writer device. On the other hand, in order to detect a request command transmitted by the reader/writer device, the RF ID tag senses, in a fixed cycle, a carrier, i.e., detects the intensity of a received RF signal. The RF ID tag is adapted to operate for reception and then operate for transmission, only when a carrier is detected. If the cycle length of transmission in the reader/writer device is two seconds as an example, the carrier sensing duration also requires to have about two or more seconds in order to ensure the detection.

In general, when the RF ID tag receives no request from the reader/writer device, the RF ID tag is required to enter a power down mode of operation in a duration intervening between adjacent carrier sensing durations so that the power consumption is reduced as much as possible and that the battery run time is extended. However, if about two seconds is reserved for the carrier sensing duration, little time remains for the power down duration, and hence it is difficult to significantly reduce the power consumption.

Thus, the active-type RF ID tag of FIG. 1 which is required to respond to a request command transmitted in a long cycle requires a long carrier sensing duration. This increases the power consumption, and hence reduces the battery run time.

The invention will be described in connection with non-limiting embodiments with reference to the accompanying drawings. Throughout the drawings, similar symbols and numerals indicate similar items and functions.

Figure 2:
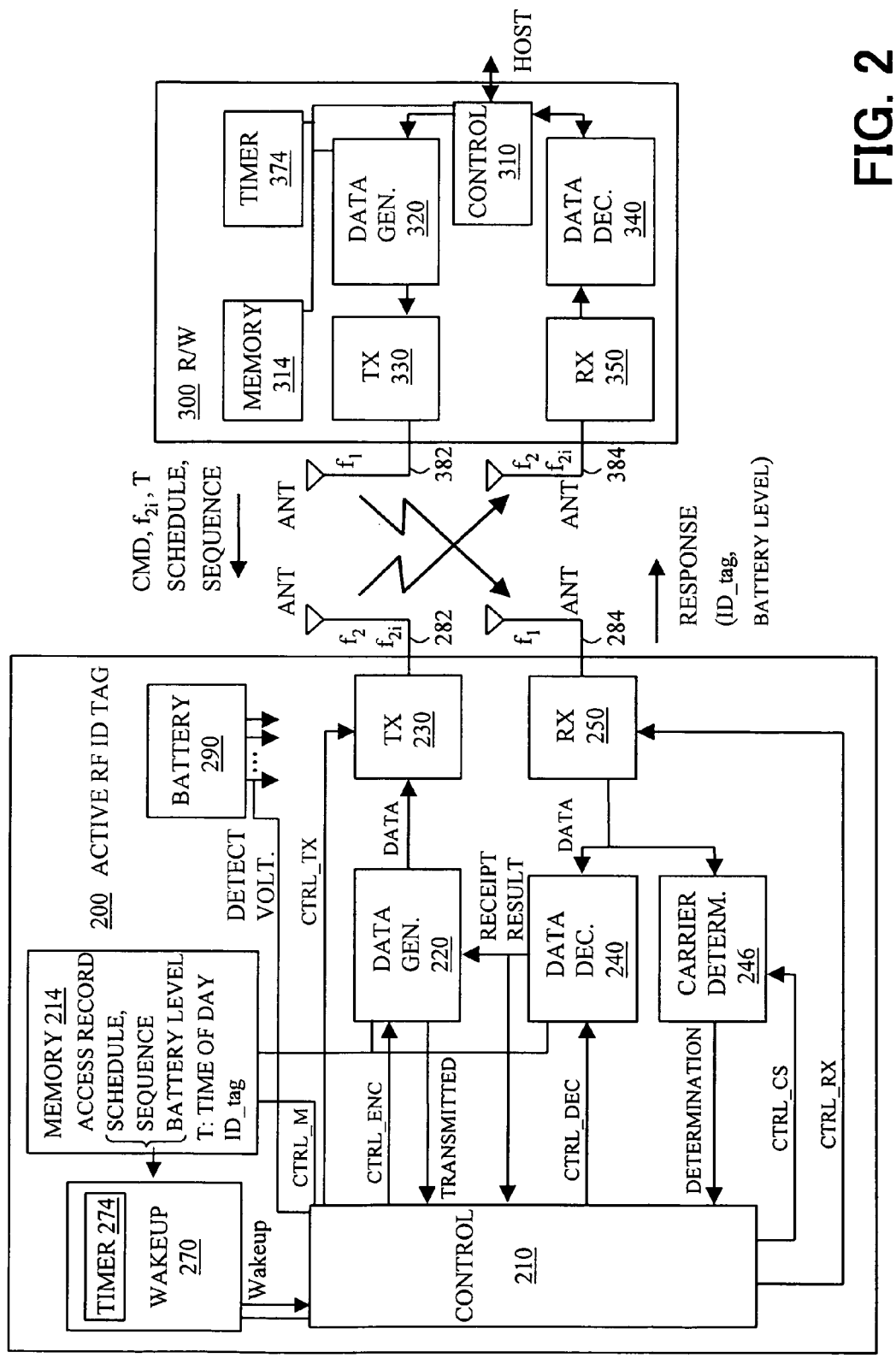
FIG. 2 shows the configurations of an active-type RF ID tag as an active contactless information storage device and of a reader/writer device, in accordance with an embodiment of the present invention.

FIG. 2 shows the configurations of an active-type RF ID tag 200 as an active contactless information storage device and of a reader/writer device 300, in accordance with an embodiment of the present invention. As an active contactless information storage device, a contactless IC card having a configuration similar to that of the active-type RF ID tag 200 may be used in place of the active-type RF ID tag 200.

The active-type RF ID tag 200 includes: a control unit 210; a memory 214; a data generation unit 220 for encoding data such as a tag ID (ID_tag) stored in the memory 214 in accordance with a predetermined encoding scheme to thereby generate encoded data; a transmitter unit (TX) 230 for modulating a carrier with the encoded data of a baseband received from the data generation unit 220, and then transmitting an RF signal at a frequency $f_2$ or RF signals at different frequencies $f_{2i}$ (i=1, 2, ..., n); a receiver unit (RX) 250 for receiving and demodulating an RF signal at a frequency $f_1$, to thereby generate baseband encoded data, and then generating data indicative of the carrier intensity of the received RF signal; a data decoding unit 240 for decoding the encoded data received from the receiver unit 250 in accordance with the predetermined encoding scheme, to thereby generate decoded data; a carrier determination unit 246 for determining the presence or absence of a received RF signal carrier in accordance with the data indicative of the carrier intensity; a wakeup unit 270 for generating a wakeup signal in accordance with a time control sequence having been set up beforehand; a transmission antenna (ANT) 282 coupled to the transmitter unit 230; a receiving antenna (ANT) 284 coupled to the receiver unit 250; and a battery 290 for supplying power to these elements 210-270. The frequencies $f_1$ and $f_2$ may be 300 MHz and 301 MHz, respectively, for example. The frequencies $f_{2i}$ are 301 MHz, 302 MHz, ..., 305 MHz, for example. The transmission output power of the transmitter unit (TX) 230 may be 100 mW for example. Alternatively, the antennas 282 and 284 may be composed of a single antenna.

The control unit 210 is always in an active state after power activation, and provides a memory control signal CTRL_M, a data generation control signal CTRL_ENC, a transmission control signal CTRL_TX, a reception control signal CTRL_RX, a data decode control signal CTRL_DEC, a carrier determination control signal CTRL_CS and a wakeup unit control signal to the memory 214, the data generation unit 220, the transmitter unit 230, the receiver unit 250, the data decoding unit 240, the carrier determination unit 246, and the wakeup unit 270, respectively. The control unit 210 may be a microprocessor or microcomputer that operates in accordance with a program.

The memory 214 stores information such as, the tag ID (ID_tag) of the RF ID tag 200, the current time-of-day information T, records of accesses performed by the reader/writer device 300, a control schedule and a time control sequence of the wakeup unit 270, and the current remaining power level of the battery 290. These pieces of information are stored and updated under the control of the control unit 210. The control unit 210 regularly or periodically detects the value of the supply voltage of the battery 290 to thereby determine the current remaining battery power level, and then stores information indicative of the remaining power level of the battery 290 into the memory 214.

The wakeup unit 270 includes a timer 274 for measuring time and thereby generating a time of day, and is always in an active state after the power activation of the RF ID tag 200. In accordance with the time of day of the timer 274 and with the control schedule and the time control sequence read out from the memory 214 and set up beforehand, the wakeup unit 270 provides a wakeup signal to the control unit 210 in a predetermined cycle, for example, of two seconds. When a control schedule and a time control sequence, the current time-of-day information T, and an instruction for correcting or updating the control schedule and the time control sequence are received as the received data from the reader/writer device 300, the control unit 210 corrects and updates the current time of day T, the control schedule and the time control sequence in the memory 214. The control unit 210 corrects the time of day of the timer 274 in accordance with the current time of day information T in the memory 214, and then writes and updates the current time of day T generated by the timer 274 in the memory 214.

The data generation unit 220 generates data of a predetermined format containing the tag ID (ID_tag) stored in the memory 214 and the like, then encodes the data in accordance with the predetermined encoding scheme, and then provides the data to the transmitter unit 230. The data may include the remaining battery power level and the access record. The data decoding unit 240 decodes the received encoded data in accordance with the predetermined encoding scheme, and then provides the decoded data to the data generation unit 220 and to the control unit 210. The carrier determination unit 246 receives, from the receiver unit 250, data indicative of the power intensity of the received RF signal carrier, thereby determines the presence or absence of a received carrier to provide the resultant determination to the control unit 210.

The reader/writer device 300 includes: a control unit 310 for transmitting and receiving data to and from a host computer (not shown); a memory 314; a data generation unit 320 for generating data of a predetermined format containing a command (CMD) and the like received from the control unit 310, then encoding the data in accordance with the predetermined encoding scheme, and thereby generating encoded data; a transmitter unit (TX) 330 for modulating the carrier with the baseband encoded data received from the data generation unit 320, and then transmitting an RF signal at a frequency $f_1$; a receiver unit (RX) 350 for receiving an RF signal at a frequency $f_2$ or RF signals at frequencies $f_{21}$-$f_{2n}$; a data decoding unit 340 for decoding the data received from the receiver unit 350 in accordance with the predetermined encoding scheme, thereby generating baseband encoded data, and then providing the decoded data to the control unit 310; a timer 374 for measuring time and thereby generating a time of day; a transmission antenna (ANT) 382 coupled to the transmitter unit 330; and a receiving antenna (ANT) 384 coupled to the receiver unit 350. The transmission output power of the transmitter unit (TX) 330 is 100 mW for example. Alternatively, the antennas 382 and 384 may be composed of a single antenna.

When the control unit 310 receives a command such as a tag ID request command from the host computer, it provides data containing the command to the data generation unit 320. The data may contain: the transmission frequency $f_2$ or $f_{2i}$ to be used in the RF ID tag 200; the reference current time-of-day information T; and a control schedule and a time control sequence which are new or updated. The command may contain an instruction of correcting or updating the time of the timer 274, in addition to the current time-of-day information T. Further, the command may contain an instruction of correcting or updating the schedule or the sequence stored in the memory 214, in addition to the control schedule or the time control sequence which are new or updated.

Figure 3:
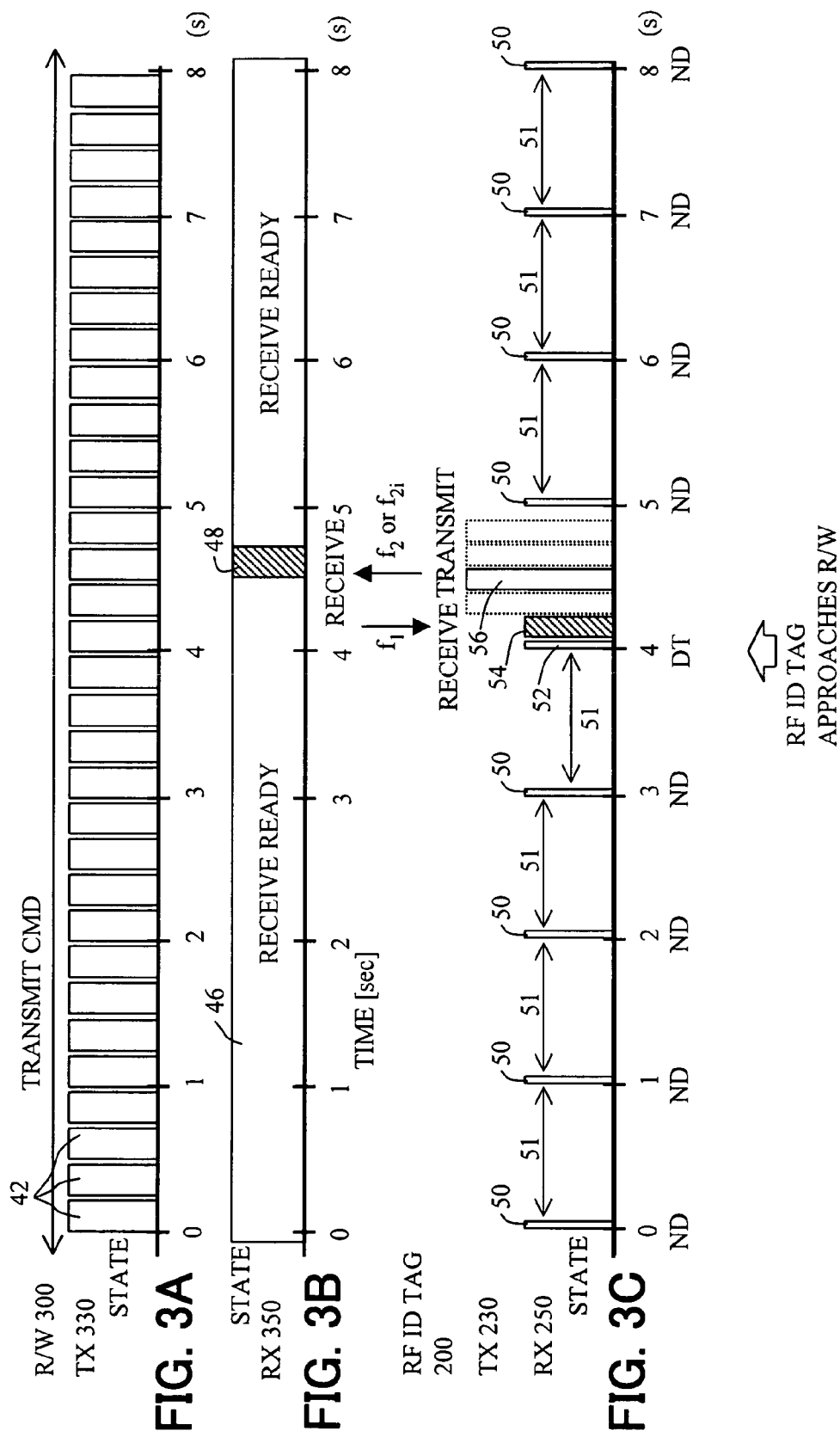
FIG. 3A shows a time chart of processing for transmission of an RF signal carrying a command transmitted from the reader/writer device.
FIG. 3B shows a time chart of a receive ready state and of processing for reception of a received RF signal in the reader/writer device.
FIG. 3C shows a time chart of carrier sensing, processing for reception of a received RF signal, and processing for transmission of an RF signal carrying a response, in the active-type RF ID tag.

FIG. 3A shows a time chart of processing for transmission 42 of an RF signal carrying a command transmitted from the reader/writer device 300. FIG. 3B shows a time chart of a receive ready state 46 and of processing for reception 48 of a received RF signal in the reader/writer device 300. FIG. 3C shows a time chart of carrier sensing 50 and 52, processing for reception 54 of a received RF signal, and processing for transmission 56 of an RF signal carrying a response, in the active-type RF ID tag 200.

Referring to FIG. 3A, the data generation unit 320 of the reader/writer device 300 generates data containing a tag ID request command for the RF ID tag received from the control unit 310, then encodes the data in accordance with the predetermined encoding scheme, and thereby generates encoded data. The transmitter unit 330 continually transmits the RF signal carrying the command in the successive time slots at short intervals in the processing for transmission 42.

Referring to FIG. 3C, in the active-type RF ID tag 200, in response to a wakeup signal from the wakeup unit 274, the control unit 210 enables the receiver unit 250 and the carrier determination unit 246 in the periods for carrier sensing 50 and 52 with a predetermined duration, for example of approximately 1-10 ms, occurring in a fixed cycle, for example of 2 seconds. This causes the receiver unit 250 to enter a receive ready state. Then the enabled carrier determination unit 246 determines the presence or absence of a received carrier, in accordance with the data received from the receiver unit 250 indicating the power intensity of the received RF signal carrier. When the RF ID tag 200 is not located near the reader/writer device 300, the carrier determination unit 246 detects no carrier (ND), and hence determines the absence of a carrier. In a period of time 51 intervening between two adjacent carrier sensing periods 50, the RF ID tag 200 enters a sleep mode of operation, during which only the control unit 210 and the wakeup unit 270 are enabled or powered on, while the other elements 214-250 are disabled or powered down. The time length of the sleep period of time 51 may be shorter than the length of time between the ending time of a carrier sensing period 50 and the starting time of the next carrier sensing period 50.

When the RF ID tag 200 approaches the reader/writer device 300 so that the receiver unit 250 of the RF ID tag 200 receives an RF signal, the carrier determination unit 246 detects the carrier of the RF signal (DT) in the period for carrier sensing 52, and hence determines the presence of a carrier. In response to the resultant determination of the presence of a carrier, the receiver unit 250 and the data decoding unit 240 are enabled in the time period for the subsequent processing for reception 54 with a predetermined duration, for example, of 100 ms. Then, the enabled receiver unit 250 receives and demodulates the RF signal, and thereby generates encoded data containing a command. The enabled data decoding unit 240 decodes the data in accordance with the predetermined encoding scheme, then extracts the command from the data, and then provides the command to the control unit 210. In response to the command, the control unit 210 enables the data generation unit 220 and the transmitter unit 230 in a time period or slot of processing for transmission 56 selected at random within a predetermined period of time, each time slot having a predetermined duration, for example, of 100 ms. The enabled data generation unit 220 generates data containing the tag ID (ID_tag) retrieved from the memory 214, and then encodes the data in accordance with the predetermined encoding scheme. The enabled transmitter unit 230 modulates the carrier with the response data containing the tag ID, and then transmits the RF signal.

Referring to FIG. 3B, the receiver unit 350 of the reader/writer device 300 is always in the receive ready state 46. When the RF ID tag 200 approaches the reader/writer device 300 and the receiver unit 350 receives an RF signal, the receiver unit 350 demodulates the received RF signal in the time period of processing for reception 48 and generates encoded data. The data decoding unit 350 decodes the encoded data in accordance with the predetermined encoding scheme, then reproduces the response data containing the tag ID, and then provides the reproduced tag ID to the control unit 310. The control unit 310 provides the tag ID to the host computer. The host computer processes the tag ID to use for monitoring and managing the article distribution or the persons.

In general, the total time during which the RF ID tag 200 is not located near the reader/writer device 300 is significantly long. Thus, the active-type RF ID tag 200 is in a sleep mode of operation for the most time. This significantly reduces the power consumption of the active-type RF ID tag 200, and hence significantly increases the run time of the battery 290.

Figure 4:
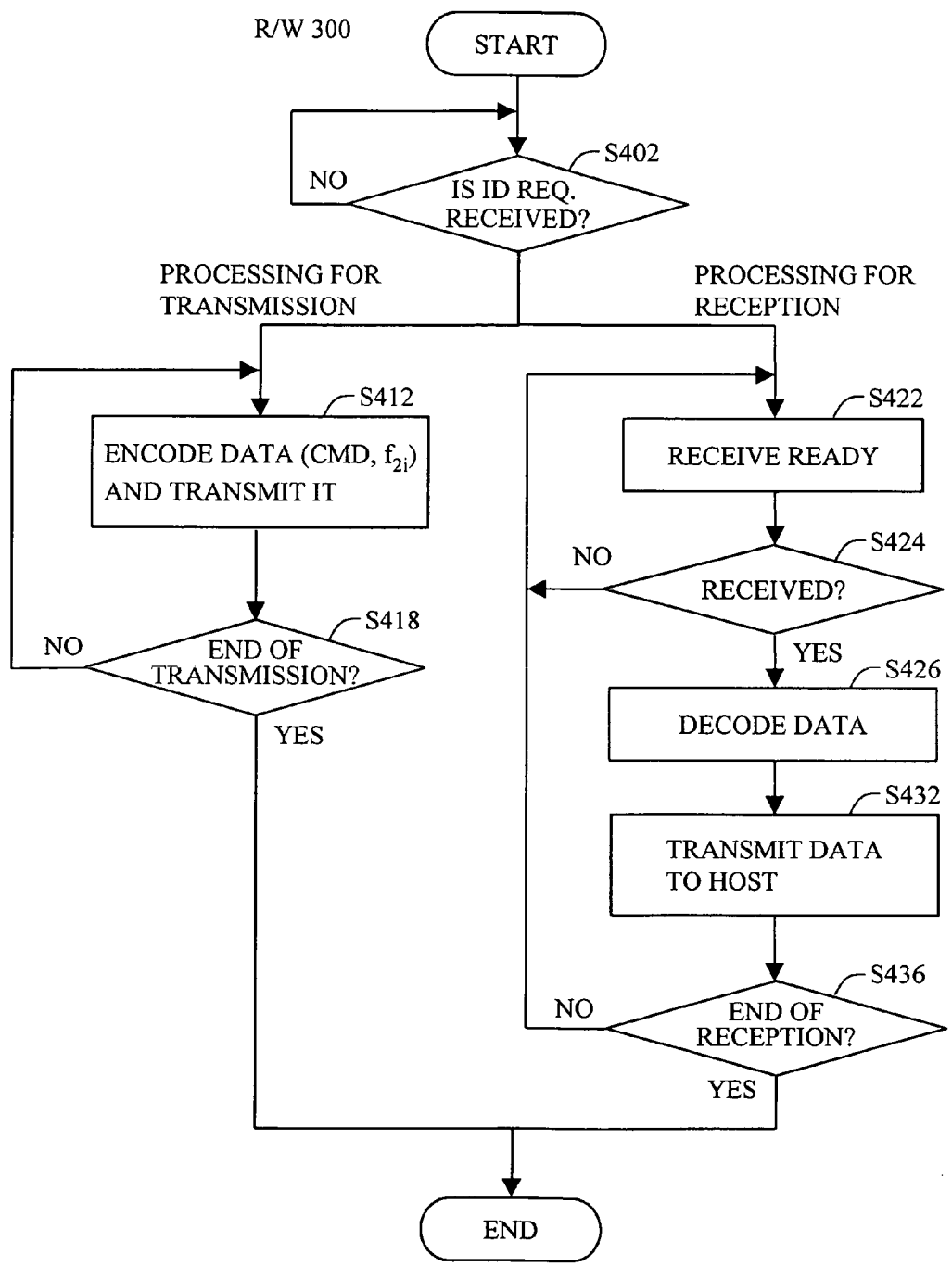
FIG. 4 shows a flow chart for the processing performed by the reader/writer device.
Figure 5A:
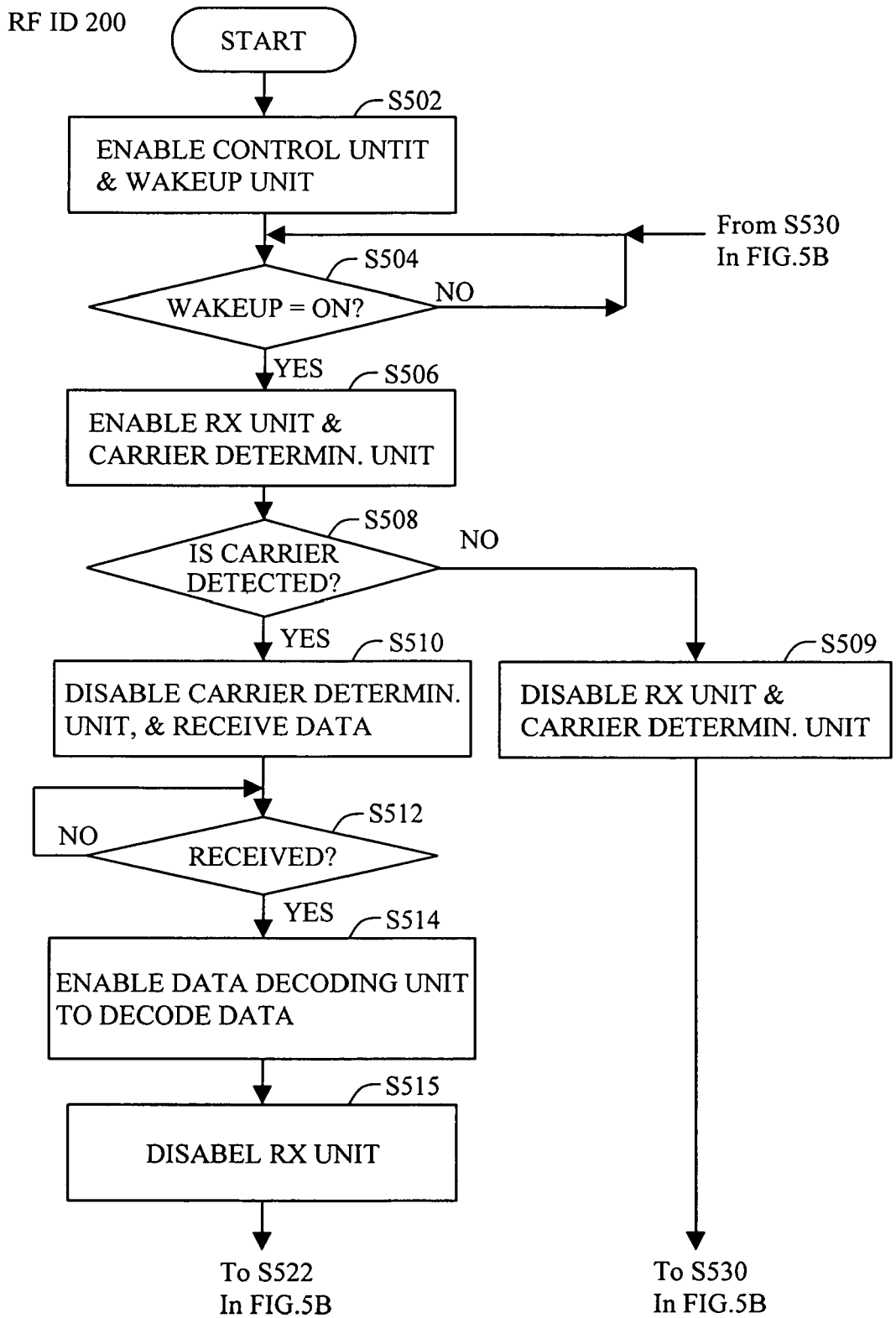
FIGS. 5A and 5B show a flow chart for the processing performed by the active-type RF ID tag.
Figure 5B:
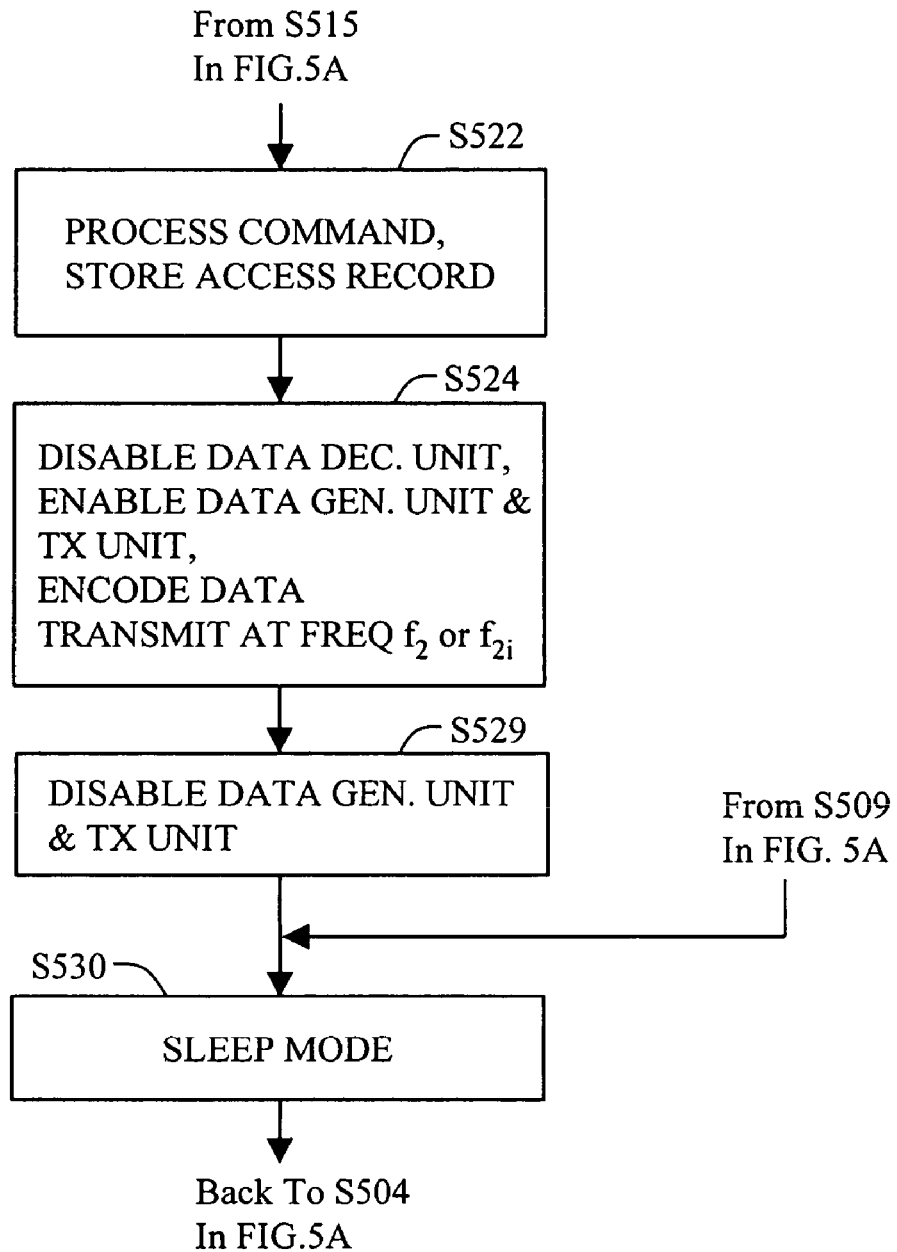

FIG. 4 shows a flow chart for the processing performed by the reader/writer device 300. FIGS. 5A and 5B show a flow chart for the processing performed by the active-type RF ID tag 200.

Referring to FIG. 4, at Step 402, the control unit 310 of the reader/writer device 300 determines whether a tag ID request command has been received from the host computer. The Step 402 is repeated until a request for the tag ID is detected. When a request for the tag ID is detected, the procedure proceeds to Step 412 for processing for transmission and to Step 422 for processing for reception.

At Step 412, the control unit 310 provides the ID request command and the related information to the data generation unit 320. The data generation unit 320 generates data containing the ID request command, and then encodes the generated data in accordance with a predetermined encoding scheme such as the NRZ (Non-Return-to-Zero) encoding system or the Manchester encoding system. The transmitter unit 330 modulates the carrier with the encoded data in the time slot of processing for transmission 42 of FIG. 3A, and then transmits the RF signal at a frequency $f_1$. The control unit 310 may incorporate, into the ID request command, data for specifying the transmission frequency $f_2$ or the variable transmission frequencies $f_{2i}$ used for a response to the ID request command; data indicative of time of day or time slots to be used for the variable transmission frequencies $f_{2i}$; data indicative of the current time of day T; and a control schedule and a time control sequence.

The reader/writer device 300 may change the frequencies $f_{2i}$ for the respective transmission time slots in a time-division manner. This reduces the probability of collision between response RF signals transmitted from a plurality of RF ID tags which simultaneously approach to it. This increases the number of RF ID tags that the reader/writer device 300 can simultaneously identify.

At Step 418, the control unit 210 determines whether the processing for data transmission is to be terminated. If it is determined that the data transmission is terminated, the procedure exits this routine. If it is determined that the processing for data transmission is to be continued, the procedure returns to Step 412. In FIG. 3A, the data transmission is repeated and continued.

Referring to FIG. 5A, at Step 502, when the RF ID tag 200 is activated, the control unit 210 and the wakeup unit 270 are enabled. Once the RF ID tag 200 is activated, the control unit 210 and the wakeup unit 270 are always enabled, and hence in an active state. In accordance with the timer 274 and with the time control sequence, the wakeup unit 270 provides the control unit 210 with a wakeup signal indicative of the timing for carrier sensing of a received RF signal in a predetermined cycle. At Step 504, the control unit 210 determines whether the wakeup signal received from the wakeup unit 270 indicates an ON state. The control unit 210 repeats the Step 504 until the wakeup signal goes to the ON state.

If it is determined at Step 504 that the wakeup signal indicates the ON state, then the control unit 210 at Step 506 enables the receiver unit 250 and the carrier determination unit 246 for a short duration, for example, of approximately 1-10 ms. Then, the enabled receiver unit 250 enters the state of being ready to receive an RF signal. In accordance with the data received from the receiver unit 250 that is indicative of the received carrier power, the enabled carrier determination unit 246 determines the presence or absence of a received RF signal carrier, and then provides the resultant determination to the control unit 210. At Step 508, in accordance with the resultant determination, the control unit 210 determines whether a carrier is detected. If it is determined that no carrier is detected, the control unit 210 at Step 509 disables the receiver unit 250 and carrier determination unit 246. After that, the procedure proceeds to Step 530.

If it is determined at Step 508 that a carrier is detected, then the control unit 210 at Step 510 disables carrier determination unit 246 and maintains to enable the receiver unit 250 in a further predetermined duration, for example of 100-200 ms, to receive an RF signal at a frequency $f_1$ carrying a command from the reader/writer device 300 (reception 54 in FIG. 3C), and then demodulates the received RF signal. At Step 512, the control unit 210 determines whether the receiver unit 250 has received the RF signal. The Step 512 is repeated until the reception of the RF signal is completed.

If it is determined at Step 512 that the RF signal has been received, then, the control unit 210 at Step 514 enables the data decoding unit 240, while the enabled data decoding unit 240 receives the received data from the receiver unit 250 under the control of the control unit 210, and then decodes the data in accordance with the predetermined encoding scheme. At Step 515, the control unit 210 disables the receiver unit 250.

Referring to FIG. 5B, at Step 522, the control unit 210 receives the decoded data containing the ID request command from the data decoding unit 240, then processes the received command contained in the decoded data, and then stores into the memory 214 the record of access performed by the reader/writer device 300. When a time correction command and the current time-of-day information T are contained in the received data, the control unit 210 corrects or updates the time of the timer 274 of the wakeup unit 270 into the time T.

At Step 524, the control unit 210 disables the data decoding unit 240, and in accordance with the ID request command, enables the data generation unit 220 and the transmitter unit 230 in a time slot selected in accordance with a random number from a predetermined number of time slots (e.g., five time slots each having a width of 100 ms) within the predetermined duration (e.g., 500 ms). This selected time slot corresponds to the time period of the processing for transmission 56 of FIG. 3C. In accordance with the predetermined encoding scheme, the enabled data generation unit 220 encodes the data containing the tag ID (ID_tag) of the RF ID tag 200 read out from the memory 214, and then provides the data to the transmitter unit 230. The enabled transmitter unit 230 modulates the carrier with the data containing the tag ID, and then transmits via the antenna 284 an RF signal or RF signals at the predetermined frequency $f_2$ or specified frequency $f_{2i}$.

At Step 529, the control unit 210 disables the data generation unit 220 and the transmitter unit 230. At Step 530, the control unit 210 causes the RF ID tag 200 to enter the sleep mode of operation. In the sleep mode, basically, the control unit 210 and the wakeup unit 270 solely are maintained in the enabled state, while the other elements 214-250 are disabled.

Referring back to FIG. 4, at Step 422, the control unit 310 enables the receiver unit 350 to enter the receive ready state. The receiver unit 350 waits for the reception of an RF signal at a frequency $f_2$ (receive ready 46), and then receives an RF signal (processing for reception 48). At Step 424, the control unit 310 determines whether the receiver unit 350 has received the RF signal. The Step 424 is repeated until the reception is completed. If it is determined that the RF signal has been received, the receiver unit 350 at Step 426 provides the received data to the data decoding unit 340. The data decoding unit 340 decodes the received data in accordance with the predetermined encoding scheme, thereby reproduces the response data, and then provides notification of the data reception and the response data to the control unit 310.

At Step 432, the control unit 310 transmits the decoded data to the host computer. At Step 436, the control unit 310 determines whether the data receive ready state is to be terminated. When the data receive ready state is to be terminated, the procedure exits this routine. If it is determined that the data receive ready state is to be continued, the procedure returns to Step 422. In FIG. 3B, the data receive ready state is repeated and continued.

Thus, the reader/writer device 300 performs continual transmission, and is always in the receive ready state. This reduces significantly the carrier sensing time of the RF ID tag 200. Thus, when the transmission and reception take place only several times a day, for example, for entry and exit control, the most operating time is used for carrier sensing, and hence the entire power consumption of the RF ID tag 200 is reduced significantly.

In a control schedule stored in the memory 214, the holidays and a period of time between a predetermined time point and another predetermined time point in the night-time (e.g., 6:00 pm to 6:00 am) of the weekdays may be specified, while a period of time between a predetermined time point and another predetermined time point in the daytime (e.g., 6:00 am to 6:00 pm) of the weekdays may be specified. In this case, the wakeup unit 270 generates no wakeup signal on the holidays and in the night-time, i.e., the RF ID tag 200 is in a deeper sleep mode of operation, and does not perform carrier sensing at all. In contrast, it performs carrier sensing in a predetermined cycle (e.g., of one second) in the daytime of the weekdays.

Under the control of the control unit 210, the wakeup unit 270 may generate a wakeup signal depending on the remaining power level of the battery 290 stored in the memory 214. In this case, when the remaining battery power level is sufficient, carrier sensing may be performed in a relatively short cycle (e.g., of 1 second), while, when the remaining battery power level goes below a threshold, carrier sensing may be performed in a relatively long cycle (e.g., of 2 seconds). Further, data representative of the remaining battery power level may be incorporated into the response data of the RF ID tag 200, and then provided to the host computer via the reader/writer device 300, so that the host computer displays a warning of battery run-out to a user.

When the records of accesses performed by the reader/writer devices are stored as a log of accesses in the memory 214 as described above, even an unauthorized access performed by a reader/writer device other than the reader/writer device 300 can be recorded as the log. Thus, when the log of accesses is read by the reader/writer device 300 and then analyzed by the host computer, the unauthorized access can be recognized.

Figure 6:
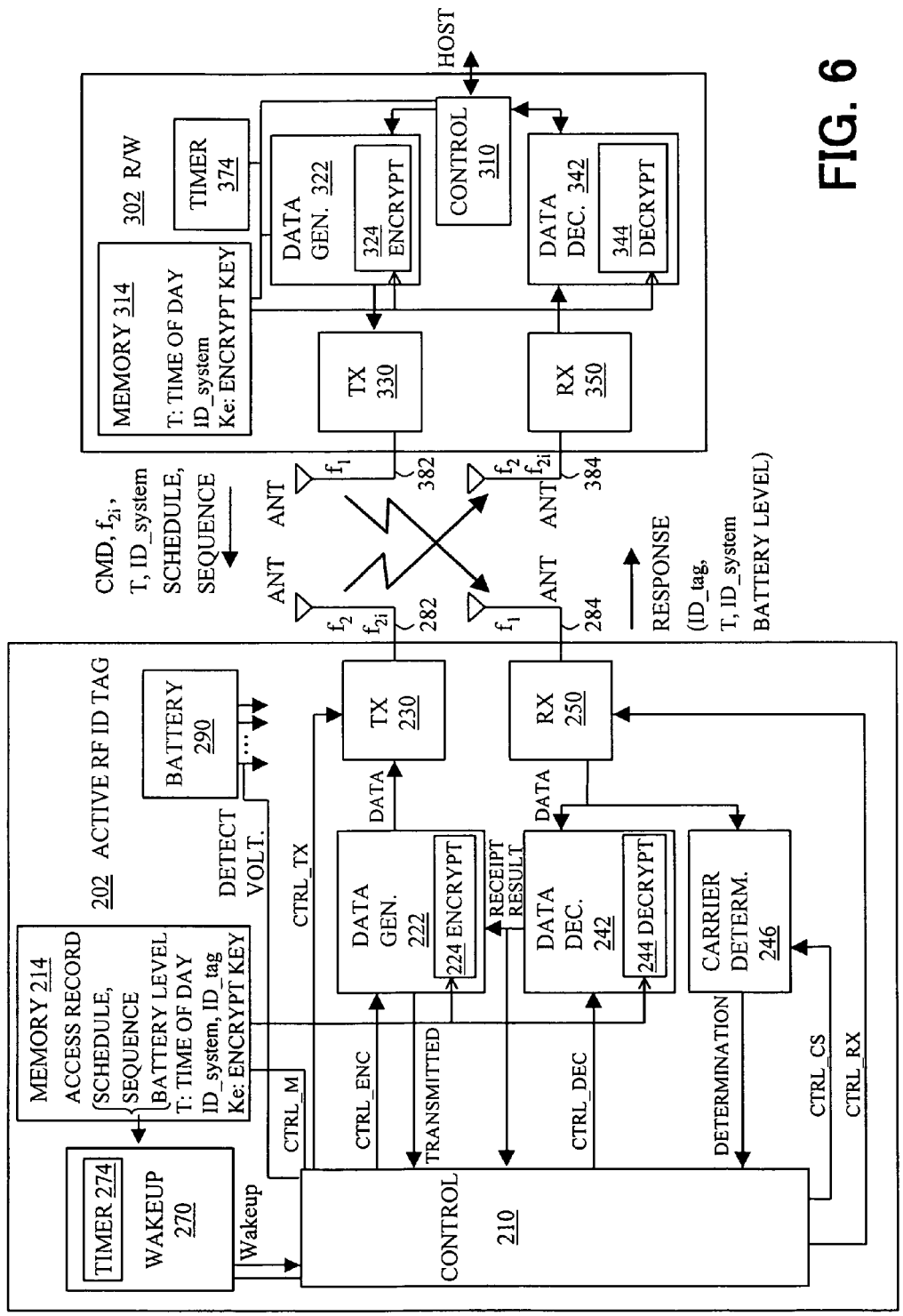
FIG. 6 shows the configurations of an active-type RF ID tag and of a reader/writer device in accordance with another embodiment of the invention.

FIG. 6 shows a modification of the first embodiment, and illustrates the configurations of an active-type RF ID tag 202 and of a reader/writer device 302 in accordance with another embodiment of the invention. In this embodiment, the data transmitted between the RF ID tag 202 and the reader/writer device 302 is encrypted, and the received data is decrypted to be used for authentication.

The RF ID tag 202 includes a data generation unit 222 in place of the data generation unit 220 in the RF ID tag 200 of FIG. 2, and includes a data decoding unit 242 in place of the data decoding unit 240 of FIG. 2. In addition to the tag ID (ID_tag), the memory 214 of the RF ID tag 202 stores the current time-of-day information T for authentication, a system ID (ID_system) for authentication, and an encryption/decryption key Ke. The memory 214 provides these pieces of information to the data generation unit 222 and the data decoding unit 242. The current time-of-day information T for authentication, the system ID for authentication, and the encryption/decryption key Ke described here are transmitted to the RF ID tag 202 by the reader/writer device 302 beforehand, and then written into the memory 214 by the control unit 210 beforehand. The data generation unit 222 includes an encryption unit 224 for encrypting the data to be transmitted, with the encryption key Ke stored in the memory 214 in accordance with a predetermined cryptosystem. The data decoding unit 242 includes a decryption unit 244 for decrypting the received data with the encryption/decryption key Ke in accordance with the predetermined cryptosystem. The other elements in the configuration of the RF ID tag 202 are similar to those of the RF ID tag 200, and hence are not described again. The system ID indicates a common ID shared by the same group consisting of the reader/writer device 302 and a plurality of RF ID tags including the RF ID tag 202. The common key cryptosystem is employed as the predetermined cryptosystem in the embodiment. Alternatively, the public key cryptosystem may be employed.

The reader/writer device 302 includes a data generation unit 322 in place of the data generation unit 320 in the reader/writer device 300 of FIG. 2, and includes a data decoding unit 342 in place of the data decoding unit 340 of FIG. 2. The memory 314 of the reader/writer device 302 stores the current time-of-day information T for authentication, the system ID (ID_system) for authentication, and an encryption/decryption key Ke. The data generation unit 324 includes an encryption unit 322 for encrypting the data to be transmitted, with the encryption key Ke stored in the memory 314 in accordance with the predetermined cryptosystem. The data decoding unit 342 includes a decryption unit 344 for decrypting the received data with the encryption/decryption key Ke in accordance with the predetermined cryptosystem. The other elements in the configuration of the reader/writer device 302 are similar to those of the reader/writer device 300, and hence are not described again.

Figure 7:
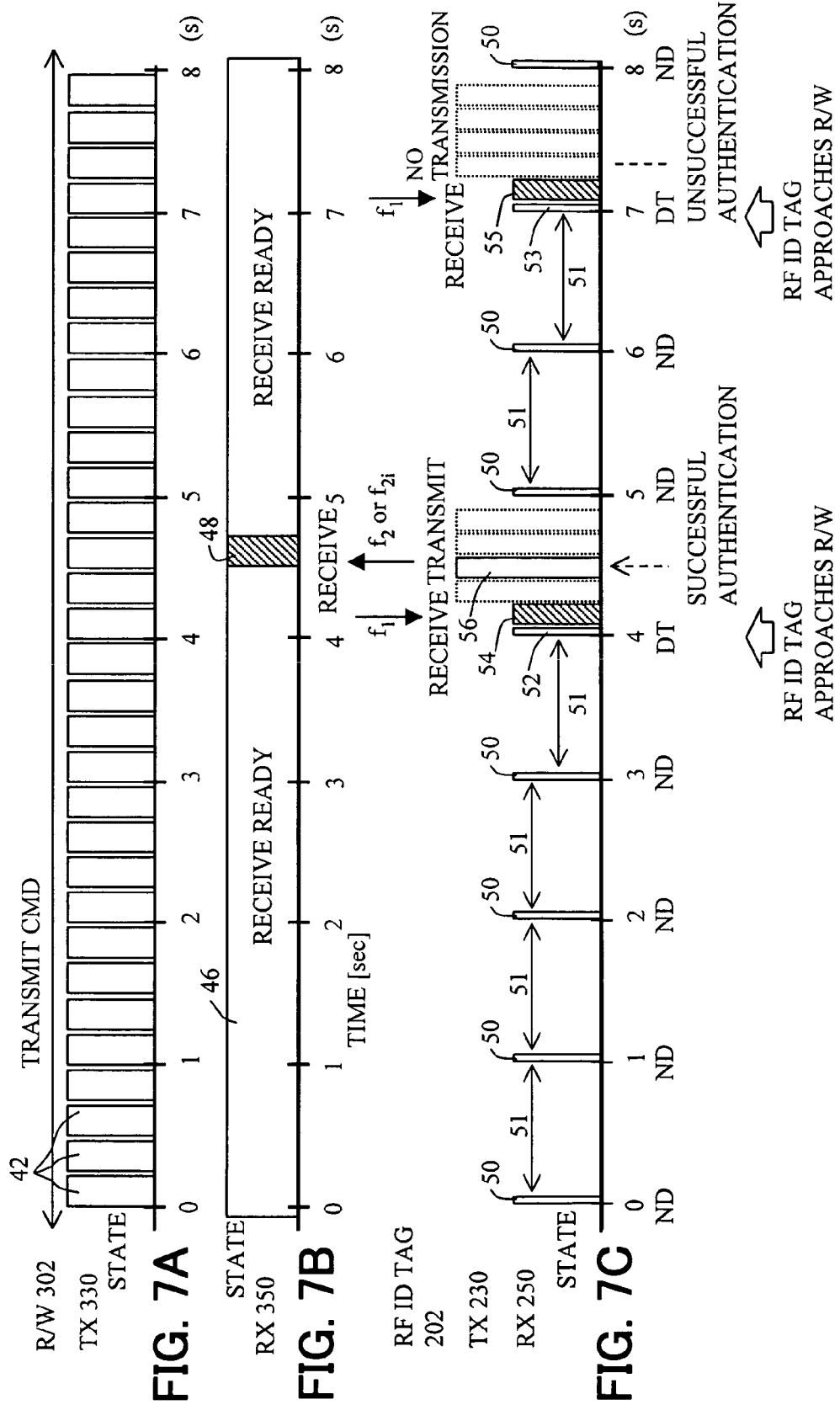
FIG. 7A shows a time chart of processing for transmission for an RF signal carrying a command (CMD) transmitted from the reader/writer device.
FIG. 7B shows a time chart of a receive ready state and of processing for reception of a received RF signal in the reader/writer device.
FIG. 7C shows a time chart of carrier sensing, processing for reception of received RF signals, and processing for transmission of an RF signal carrying a response in the case of successful authentication, in the active-type RF ID tag.

FIG. 7A shows a time chart of processing for transmission 42 for an RF signal carrying a command (CMD) transmitted from the reader/writer device 302. FIG. 7B shows a time chart of a receive ready state 46 and of processing for reception 48 of a received RF signal in the reader/writer device 302. FIG. 7C shows a time chart of carrier sensing 50, 52 and 53, processing for reception 54 and 55 of received RF signals, and processing for transmission 56 of an RF signal carrying a response in the case of successful authentication, in the active-type RF ID tag 202.

Referring to FIG. 7A, the data generation unit 322 of the reader/writer device 302 generates data containing a tag ID request command for the RF ID tag that is received from the control unit 310, then encodes the data in accordance with the predetermined encoding scheme, and thereby generates encoded encrypted data. The other transmission operation of the reader/writer device 302 is similar to that of the reader/writer device 300 of FIG. 3A.

Referring to FIG. 7C, in the active-type RF ID tag 202, the operations of the receiver unit 250 and carrier determination unit 246 are similar to those shown in FIG. 3C. Thus, in response to a wakeup signal from the wakeup unit 274, the receiver unit 250 and the carrier determination unit 246 are enabled by the control unit 210 in the periods for carrier sensing 50, 52 and 53 with the predetermined duration occurring in the fixed cycle, so that the enabled receiver unit 250 enters a receive ready state.

In response to the resultant determination of the presence of a carrier (DT) made by carrier determination unit 246, the receiver unit 250 and the data decoding unit 242 are enabled in a predetermined time period for the subsequent processing for reception 54 and 55 with the predetermined duration. The enabled receiver unit 250 receives and demodulates the RF signal, to thereby generate encoded encrypted data containing the command. The enabled data decoding unit 242 decodes the data in accordance with the predetermined encoding scheme, then decrypts the encrypted data with the encryption/decryption key Ke in accordance with the predetermined cryptosystem, then extracts the command, and then provides the command to the control unit 210. In response to the command, the control unit 210 authenticates the reader/writer device 302 in accordance with the time-of-day information T and the system ID contained in the command.

When the authentication has been successful, the data generation unit 222 and the transmitter unit 230 are enabled in a time slot of processing for transmission 56 selected at random within a predetermined period of time, each time slot having a predetermined duration. The data generation unit 222 encrypts data containing the tag ID (ID_tag), the time-of-day information T, and the system ID (ID_system) retrieved from the memory 214, with the encryption key Ke in accordance with the predetermined cryptosystem, and then encodes the encrypted data in accordance with the predetermined encoding scheme. The transmitter unit 230 modulates the carrier with the encrypted response data containing the tag ID, and then transmits the RF signal. When the authentication has been unsuccessful, the processing is terminated without generating or transmitting the data.

Referring to FIG. 7B, the receiver unit 350 of the reader/writer device 302 is always in the receive ready state 46. When the RF ID tag 202 approaches the reader/writer device so that the receiver unit 350 receives an RF signal, the receiver unit 350 demodulates the received RF signal in the time period of processing for reception 48, and then reproduces encoded encrypted data. The data decoding unit 342 decodes the encoded encrypted data in accordance with the predetermined encoding scheme, then decrypts the decoded encrypted data with the encryption/decryption key Ke in accordance with the predetermined cryptosystem, thereby reproduces the response data containing the tag ID, and then provides the reproduced response to the control unit 310. In response to the received and reproduced response, the control unit 310 authenticates the RF ID tag 202 in accordance with the time-of-day information T and the system ID contained in the response, and then provides the tag ID to the host computer.

In general, when the reader/writer device 302 and the RF ID tag 202 encrypt the data to be transmitted and perform mutual authentication in accordance with the time-of-day information T and the system ID as described above, the data transmitted by the reader/writer device 302 and the RF ID tag 202, which is intercepted by a third party, has little risk of being decrypted and used improperly. This enhances the security of the reader/writer device 302 and the RF ID tag 202.

Figure 8:
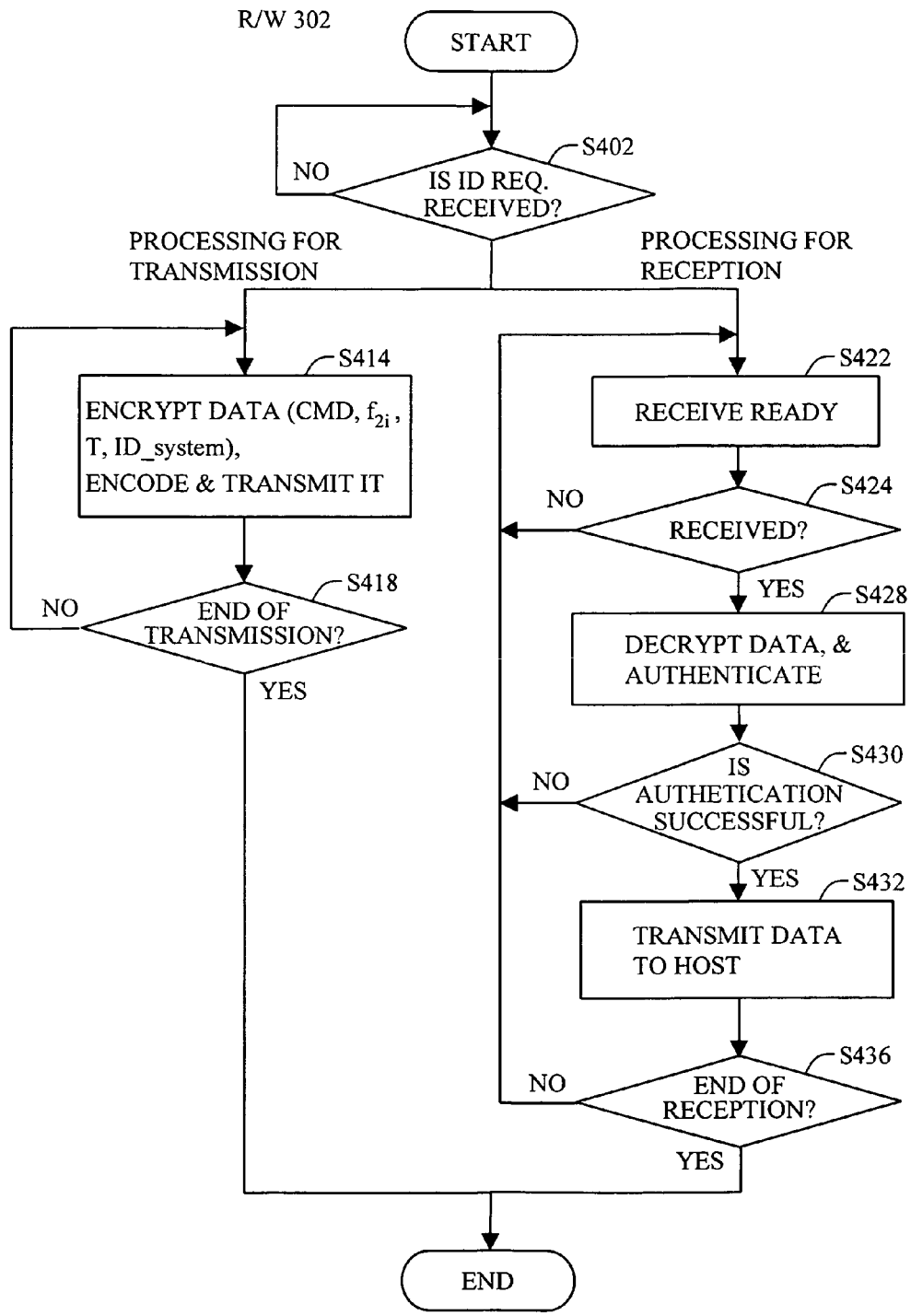
FIG. 8 shows a flow chart for the processing performed by the reader/writer device.
Figure 9A:
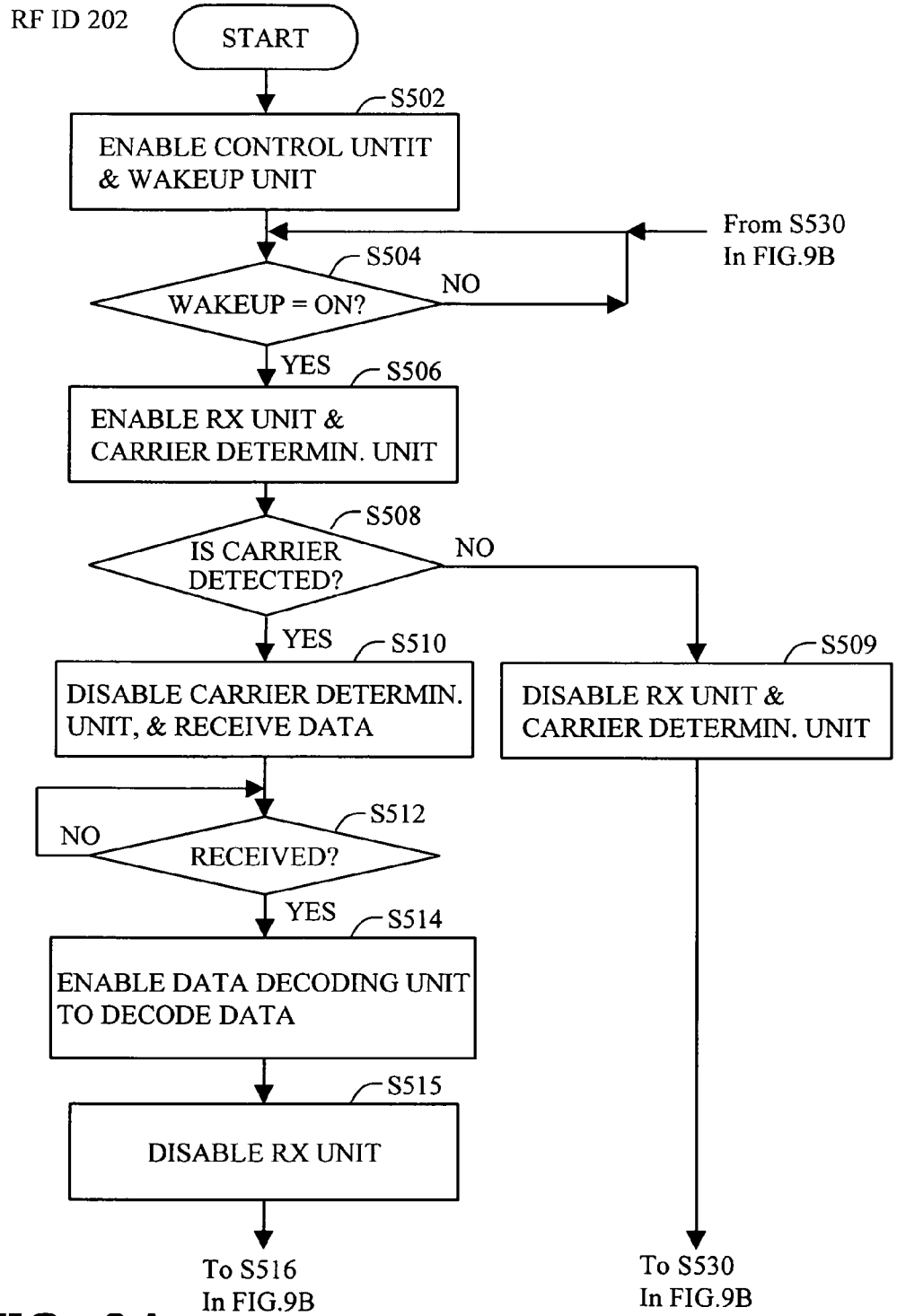
FIGS. 9A and 9B show a flow chart for the processing performed by the active-type RF ID tag.
Figure 9B:
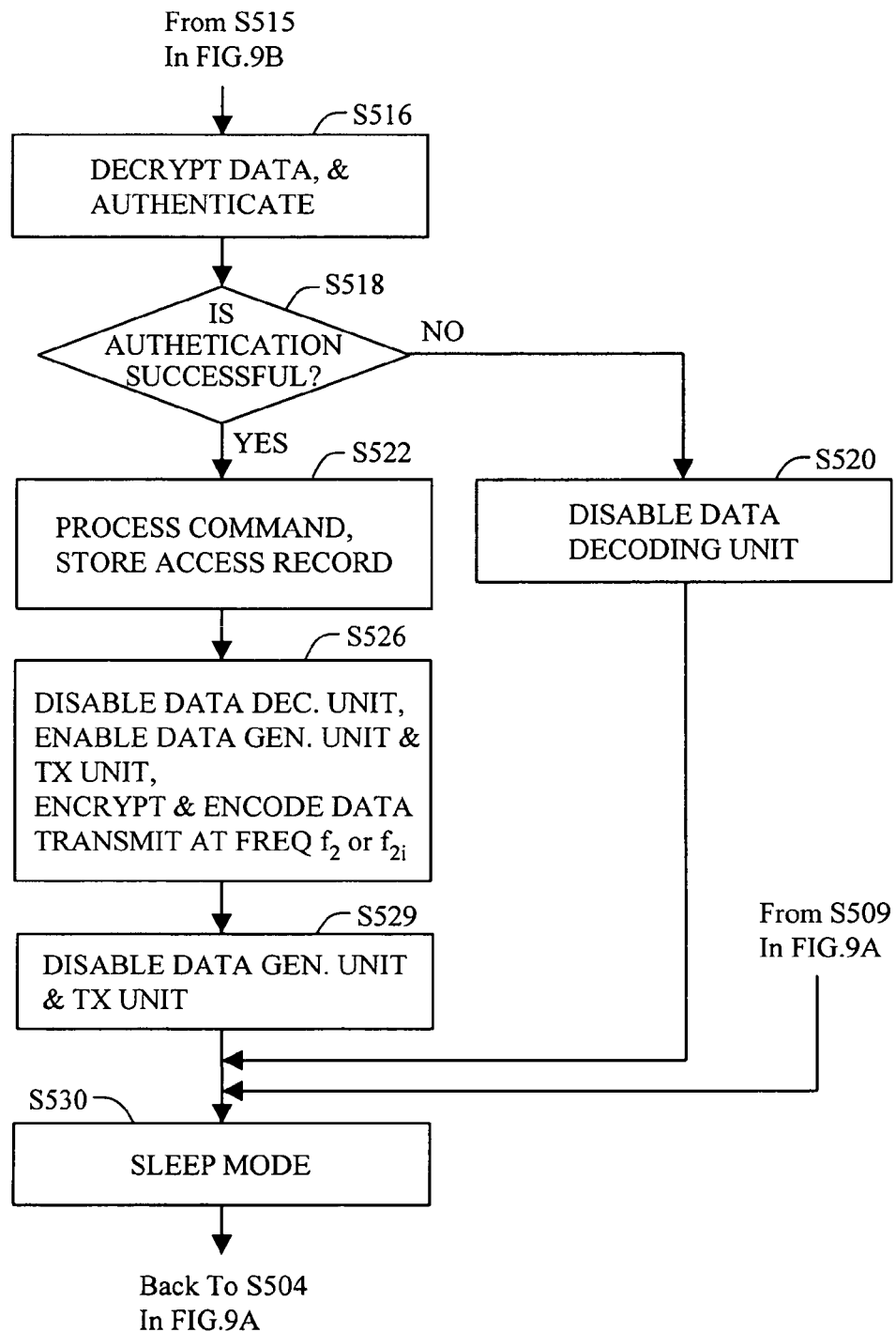

FIG. 8 shows a flow chart for the processing performed by the reader/writer device 302. FIGS. 9A and 9B show a flow chart for the processing performed by the active-type RF ID tag 202.

Referring to FIG. 8, Step 402 is similar to that of FIG. 4, and hence is not described again. At Step 414, the control unit 310 provides the ID request command to the data generation unit 322. The data generation unit 322 encrypts data containing the ID request command received from the control unit 310 and containing the current time-of-day information T and the system ID (ID_system) retrieved from the memory 314, with the encryption key Ke retrieved from the memory 314 in accordance with a predetermined cryptosystem, such as the DES (Data Description Standard), the Triple DES or the AES (Advanced Encryption Standard). Then, the data generation unit 322 encodes the encrypted data, and thereby generates encoded data. The transmitter unit 332 modulates the carrier with the encrypted data, and then transmits the RF signal at the frequency $f_1$ (processing for transmission 42 in FIG. 7A). Step 418 is similar to that of FIG. 4, and hence is not described again.

Referring to FIG. 9A, Steps 502 through 515 are similar to those of FIG. 5, and hence are not described again.

Referring to FIG. 9B, at Step 516, under the control of the control unit 210, the data decoding unit 242 decrypts the decoded data with the encryption/decryption key Ke retrieved from the memory 214 in accordance with the predetermined cryptosystem, and then provides the decrypted data containing the command, the tag ID (ID_tag), the time-of-day information T, and the system ID (ID_system) to the control unit 210. The data may contain a control schedule and a time control sequence. Upon receiving the data, the control unit 210 compares the decrypted time-of-day T and system ID with the stored time-of-day T and system ID in the memory 214, to determine whether the decrypted time information and ID match with the stored time information and ID, in order to authenticate the reader/writer device 302.

At Step 518, the control unit 210 determines whether the authentication has been successful. If it is determined that authentication has been unsuccessful, the control unit 210 at Step 520 disables the data decoding unit 242. Then, the procedure proceeds to Step 530 of FIG. 9B.

If it is determined at Step 518 that the authentication has been successful, then the control unit 210 at Step 522 receives from the data decoding unit 242 the decrypted data containing the ID request command, then processes the decrypted received command contained in decoded data, and then stores into the memory 214 the record of access from the reader/writer device 302.

At Step 526, in accordance with the ID request command, the control unit 210 enables the data generation unit 222 and the transmitter unit 230 in a time slot selected at random in accordance with a random number from a predetermined number of time slots within a predetermined period of time. This selected time slot corresponds to the time period of the processing for transmission 56 of FIG. 7C. The data generation unit 222 encrypts data containing the tag ID (ID_tag) of the RF ID tag 202, the time-of-day information T and the system ID (ID_system) read out from the memory 214, with the encryption key Ke in accordance with the predetermined cryptosystem, then encodes the encrypted data in accordance with the predetermined encoding scheme, and then provides the encoded encrypted data to the transmitter unit 230. The transmitter unit 230 modulates the carrier with the encoded encrypted data, and then transmits the RF signal at a frequency $f_2$ via the antenna 284 (transmission 56 in FIG. 7C). Steps 528 and 530 are similar to those of FIG. 5, and hence are not described again.

Referring back to FIG. 8, Steps 422 through 424 are similar to those of FIG. 4, and hence are not described again. At Step 428, the receiver unit 350 provides the received data to the data decoding unit 342. The data decoding unit 342 decodes the received data in accordance with the predetermined encoding scheme, then decrypts the decoded data in accordance with the predetermined cryptosystem, and then provides the data reception and the decrypted data to the control unit 310. The control unit 310 compares the decrypted time T and system ID with the stored time T and system ID in the memory 314, to determine whether the decrypted time information and ID match with the stored time information and ID, in order to authenticate the RF ID tag 202. Even if there is an error between the received time-of-day information T and the stored time-of-day information T that falls within a predetermined range (e.g., ±0.5 seconds) in the control unit 210 of the RF ID tag 202 and in the control unit 310 of the reader/writer device 302, they may determine that the received time-of-day information matches with the stored time-of-day information.

At Step 430, the control unit 310 determines whether the authentication has been successful. If it is determined that the authentication has been unsuccessful, the procedure returns to Step 422. If it is determined that the authentication has been successful, the procedure proceeds to Step 432. Step 436 is similar to that of FIG. 4, and hence is not described again.

Figure 10A:
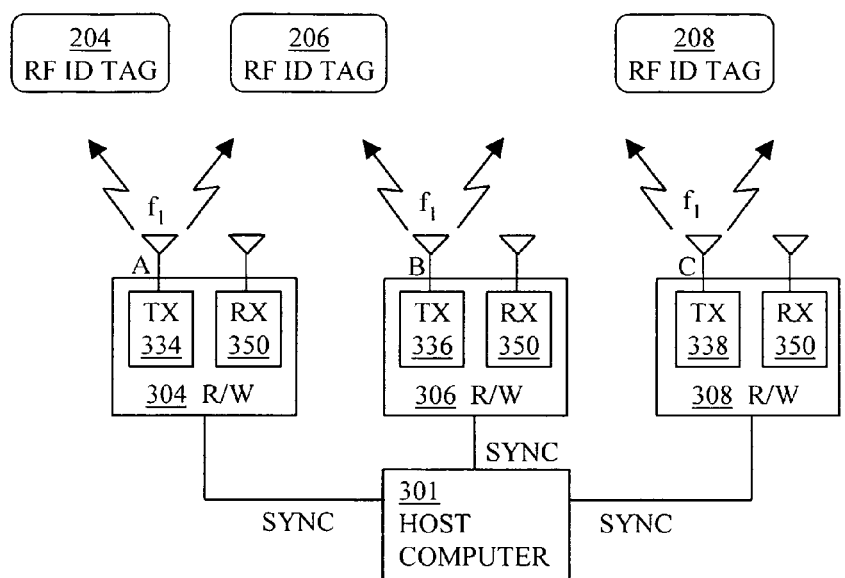
FIG. 10A shows a plurality of reader/writer device devices arranged at different locations for detecting a plurality of RF ID tags.
Figure 10B:
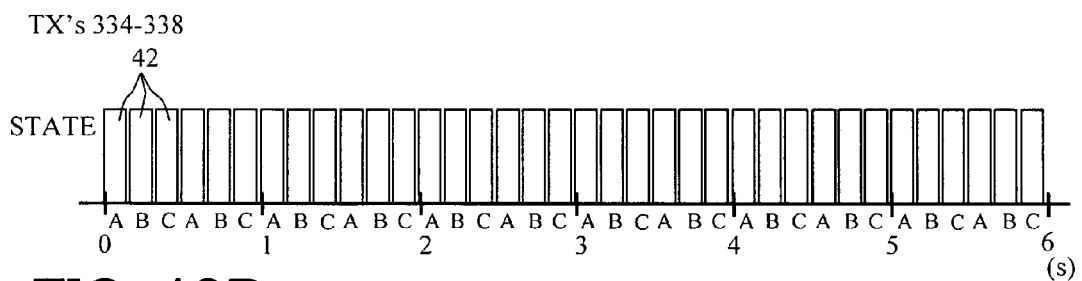
FIG. 10B shows timings of the time-division transmissions from the transmitter units in the reader/writer devices respectively.

FIG. 10A shows a plurality of reader/writer devices 304, 306 and 308 arranged at different locations for detecting a plurality of RF ID tags 204, 206, . . . , 208. FIG. 10B shows timings of the time-division transmissions from the transmitter units 334, 336 and 338 in the reader/writer devices 304, 306 and 308, respectively. The reader/writer devices 304, 306 and 308 are connected to a host computer 301 which transmits sync signals SYNC to the reader/writer devices 304, 306 and 308. In order to prevent the collision between the transmitted signals, the transmitter units 334, 336 and 338 perform command transmission 42 at a frequency $f_1$ in a time division manner in respective time slots A, B and C of FIG. 10B. The receiver unit 350 of each of the reader/writer devices 304, 306 and 308 is always in a receive ready state similarly to that of FIGS. 3B and 7B. In this way, by arranging the plurality of the reader/writer devices 304, 306 and 308 at different locations, the area for detecting the RF ID tags 204, 206, . . . 208 is expanded, so that a larger number of RF ID tags can be detected.

The invention is applicable, for example, to school entry and exit control of students with the RF ID tags, an information support system for visitors in an exhibition hall with the RF ID tags, security management of personal computers for users in an office with the RF ID tags, management of merchandise articles in a physical distribution management system with the RF ID tags, and the like.

Although the invention has been described in connection with application to the RF ID tag, it should be understood by those skilled in the art that the invention is not limited to this application and is also applicable to a contactless IC card.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. An information access system for accessing information stored in a contactless information storage device, comprising:
   a reader/writer device connected to an information processing apparatus, and being adapted to continually transmit an ID request signal at a first frequency in transmission time periods in a transmission cycle and to be continuously ready to receive an RF signal at a second frequency which is different from the first frequency; and
   an active-type contactless information storage device having:
   a memory,
   a control unit,
   a battery,
   a timer for measuring time,
   a receiver unit for sensing, using power supplied from the battery,
   a carrier of an RF signal at the first frequency for detection, and
   a transmitter unit for transmitting, using power supplied from the battery, a response signal at the second frequency when the ID request signal is received, wherein
   the control unit controls, in carrier sensing periods occurring in a carrier sensing cycle, the transmitter unit to be in an inactive state and the receiver unit to be in an active state and sense, using power supplied from the battery, a carrier of an RF signal at the first frequency, the carrier sensing period being shorter than the transmission time period of the ID request signal, the carrier sensing cycle being longer than the transmission cycle of the ID request signal, the carrier sensing cycle being determined according to the timer,
   when the receiver unit senses and detects a carrier of an RF signal at the first frequency in one of the carrier sensing periods, the control unit causes the receiver unit to receive, using power supplied from the battery, the ID request signal before a subsequent one of the carrier sensing periods, and, in response to the ID request signal, causes the transmitter unit to transmit, using power supplied from the battery, a response signal at the second frequency carrying an ID of the active-type contactless information storage device stored in the memory before the subsequent carrier sensing period; and
   when the receiver unit detects no carrier in one of the carrier sensing periods, the control unit controls the receiver unit and the transmitter unit to be in the inactive state during a non-carrier-sensing period between the one carrier sensing period and a subsequent one of the carrier sensing periods.

2. The information access system according to claim 1, wherein
   the second frequency is variable,
   the ID request signal contains information indicative of the second frequency together with the ID request,
   the transmitter unit further has a function of changing the second frequency for transmission, and
   the control unit further changes the second frequency of the transmitter unit in accordance with the information indicative of the second frequency obtained from the received ID request signal.

3. The information access system according to claim 2, wherein the reader/writer device changes the second frequency as a function of time, and incorporates, into the ID request signal at the first frequency to be transmitted, further information indicative of the second frequency and information indicative of a time for changing the second frequency.

4. The information access system according to claim 1, wherein:
   the reader/writer device has another memory;
   the memory of the active-type contactless information storage device and the other memory of the reader/writer device store a system ID, an encryption key, and time information shared by the active-type contactless information storage device and the reader/writer device;
   the ID request signal contains the system ID and the time information,
   the ID request contained in the ID request signal is encrypted together with the time information and the system ID with the encryption key;
   the active-type contactless information storage unit comprises a data decoding unit, which decrypts the ID request, the time information and the system ID, with the encryption key stored in the memory;
   the transmitter unit transmits the response signal, only when the decrypted time information and system ID match with the stored time information and system ID in the memory;
   the ID of the active-type contactless information storage device contained in the response signal is encrypted together with the time information and the system ID stored in the memory; and
   the reader/writer device decrypts the ID, the time information and the system ID, with the encryption key stored in the other memory, wherein the ID of the active-type contactless information storage device is processed as an authorized one, only when the decrypted time information and system ID match with the time information and the system ID stored in the other memory of the reader/writer device.

5. The information access system according to claim 1, wherein a plurality of such reader/writer devices are arranged at different locations, the reader/writer devices transmit the respective RF signals at the first frequency in different timings in a time division manner.

6. An active-type contactless information storage device comprising:
   a memory;
   a battery;
   a timer for measuring time;
   a receiver unit being adapted to sense, using power supplied from the battery, a carrier of an ID request signal at a first frequency from a reader/writer device for detection, when the active-type contactless information storage device approaches the reader/writer device;
   a transmitter unit for modulating a carrier with data and then transmitting a response signal at a second frequency to the reader/writer device, while using power supplied from the battery; and
   a control unit for controlling the receiver unit and the transmitter unit, wherein
   the control unit controls, in carrier sensing periods occurring in a carrier sensing cycle, the transmitter unit to be in an inactive state and the receiver unit to be in an active state and sense, using power supplied from the battery, a carrier of an RF signal at the first frequency, the carrier sensing period being shorter than a time period of the ID request signal., the carrier sensing cycle being longer than a cycle of occurring the ID request signal, the carrier sensing cycle being determined according to the timer, when the receiver unit senses and detects a carrier of an RF signal at the first frequency in one of the carrier sensing periods, the control unit causes the receiver unit to receive, using power supplied from the battery, the ID request signal before a subsequent one of the carrier sensing periods, and, in response to the ID request signal, causes the transmitter unit to transmit, using power supplied from the battery, a response signal at the second frequency carrying an ID of the active-type contactless information storage device stored in the memory before the subsequent carrier sensing period; and when the receiver unit detects no carrier in one of the carrier sensing periods, the control unit controls the receiver unit and the transmitter unit to be in the inactive state during a non-carrier-sensing period between the one carrier sensing period and a subsequent one of the carrier sensing periods.

7. An active-type contactless information storage device comprising:
   a memory;
   a battery;
   a timer for measuring time;
   a receiver unit being adapted to sense, using power supplied, from the battery, a carrier of an ID request signal at a first frequency from a reader/writer device for detection and reproduce an encoded ID request, when the active-type contactless information storage device approaches the reader/writer device;
   a data decoding unit for decoding the encoded ID request to thereby reproduce a decoded ID request;
   an encoding unit for retrieving an ID from the memory, and then encoding the ID to thereby generate the encoded data;
   a transmitter unit for modulating a carrier with the generated encoded data and then transmitting a response signal at a second frequency to the reader/writer device, while using power supplied from the battery; and
   a control unit for controlling the receiver unit, the data decoding unit, the encoding unit and the transmitter unit, wherein
   the control unit controls, in carrier sensing periods occurring in a carrier sensing cycle, the transmitter unit to be in an inactive state and the receiver unit to be in an active state and sense, using power supplied from the battery, a carrier of an RF signal at the first frequency, the carrier sensing period being shorter than a time period of the ID request signal, the carrier sensing cycle being longer than a cycle of occurring the ID request signal, the carrier sensing cycle being determined according to the timer,
   when the receiver unit senses and detects a carrier of an RF signal at the first frequency in one of the carrier sensing periods, the control unit causes the receiver unit to receive, using power supplied from the battery, the ID request signal before a subsequent one of the carrier sensing periods, then causes the data decoding unit to reproduce the ID request, then in response to the ID request, causes the encoding unit to encode the ID retrieved from the memory, and then causes the transmitter unit to transmit, using power supplied from the battery, the response signal at the second frequency carrying the encoded ID before the subsequent carrier sensing period, and
   when the receiver unit detects no carrier in one of the carrier sensing periods, the control unit controls the receiver unit and the transmitter unit to be in the inactive state during a non-carrier-sensing period between the one carrier sensing period and a subsequent one of the carrier sensing periods.

8. The active-type contactless information storage device according to claim 7, wherein
   the second frequency is variable,
   the ID request signal contains information indicative of the second frequency together with the ID request,
   the transmitter unit further has a function of changing the second frequency for transmission, and
   the control unit further changes the second frequency of the transmitter unit in accordance with the information indicative of the second frequency obtained from the received ID request signal.

9. The active-type contactless information storage device according to claim 7, wherein
   the control unit stores, in the memory, time information obtained from the ID request signal received from the reader/writer device, then corrects the timer in accordance with the time information, and then stores in the memory the time measured by the timer, and
   the control unit determines the carrier sensing periods in the carrier sensing cycle in accordance with the time stored in the memory.

10. The active-type contactless information storage device according to claim 7, wherein
    the control unit stores, in the memory, the time information and a schedule obtained from the ID request signal received from the reader/writer device, then corrects the timer in accordance with the time information, and then stores in the memory the time measured by the timer, and
    in accordance with the time stored in the memory and the schedule stored in the memory, the control unit controls the receiver unit, the data decoding unit, the encoding unit and the transmitter unit to maintain the inactive state for a inactive period of time.

11. The active-type contactless information storage device according to claim 7, wherein
    the control unit further detects a remaining power level of the battery, and
    when the remaining power level of the battery is lower than a threshold value, the control unit sets the carrier sensing cycle to be longer.

12. The active-type contactless information storage device according to claim 7, wherein, when it receives the ID request from the reader/writer device, the control unit stores in the memory a record of access performed by the reader/writer device.

13. The active-type contactless information storage device according to claim 7, wherein
    the ID request contained in the ID request signal is encrypted together with a system ID and time information shared by the active-type contactless information storage device and the reader/writer device,
    the data decoding unit decrypts the ID request, the time information and the system ID, wherein the transmitter unit transmits the response signal, only when the decrypted time information and system ID match with the time information and system ID stored in the memory, and
    an ID contained in the response signal is encrypted together with the time information and the system ID stored in the memory, by the encoding unit.

14. An information access system for accessing information stored in a contactless information storage device, comprising:

a reader/writer device connected to an information processing apparatus, and being adapted to continually transmit an ID request signal at a first frequency in transmission time periods in a transmission cycle and to be continuously ready to receive an RF signal at a second frequency which is different from the first frequency; and an active-type contactless information storage device having:
- a memory,
- a control unit,
- a timer for measuring time,
- a receiver unit for sensing, a carrier of an RF signal at the first frequency for detection, and
- a transmitter unit for transmitting, a response signal at the second frequency when the ID request signal is received, wherein the control unit controls, in carrier sensing periods occurring in a carrier sensing cycle, the transmitter unit to be in an inactive state and the receiver unit to be in an active state and sense a carrier of an RF signal at the first frequency, the carrier sensing period being shorter than the transmission time period of the ID request signal, the carrier sensing cycle being longer than the transmission cycle of the ID request signal, the carrier sensing cycle being determined according to the timer, when the receiver unit detects a carrier of an RF signal at the first frequency in one of the carrier sensing periods, the control unit causes the receiver unit to further receive the ID request signal before a subsequent one of the carrier sensing periods, and, in response to the ID request signal, further causes the transmitter unit to transmit a response signal at the second frequency that carries an ID of the active-type contactless information storage device stored in the memory before the subsequent carrier sensing period, and when the receiver unit detects no carrier in one of the carrier sensing periods, the control unit controls the receiver unit and the transmitter unit to be in the inactive state during a non-carrier-sensing period between the one carrier sensing period and a subsequent one of the carrier sensing periods.

15. An active-type contactless information storage device comprising:
- a memory;
- a timer for measuring time;
- a receiver unit being adapted to sense a carrier of an ID request signal at a first frequency from a reader/writer device for detection, when the active-type contactless information storage device approaches the reader/writer device;
- a transmitter unit for modulating a carrier with data and then transmitting a response signal at a second frequency to the reader/writer device; and
- a control unit for controlling the receiver unit and the transmitter unit, wherein the control unit controls, in carrier sensing periods occurring in a carrier sensing cycle, the transmitter unit to be in an inactive state and the receiver unit to be in an active state and sense a carrier of an RF signal at the first frequency, the carrier sensing period being shorter than a time period of the ID request signal, the carrier sensing cycle being longer than a cycle of occurring the ID request signal, the carrier sensing cycle being determined according to the timer, when the receiver unit detects a carrier of an RF signal at the first frequency in one of the carrier sensing periods, the control unit causes the receiver unit to further receive the ID request signal before a subsequent one of the carrier sensing periods, and, in response to the ID request signal, further causes the transmitter unit to transmit a response signal at the second frequency carrying an ID of the active-type contactless information storage device stored in the memory before the subsequent carrier sensing period; and when the receiver unit detects no carrier in one of the carrier sensing periods, the control unit controls the receiver unit and the transmitter unit to be in the inactive state during a non-carrier-sensing period between the one carrier sensing period and a subsequent one of the carrier sensing periods.

\* \* \* \* \*